United States Patent
Bertocchi (10) Patent No.: US 9,027,472 B2
(45) Date of Patent: May 12, 2015

(54) MACHINE HAVING AN IMPROVED BLADE STRUCTURE, FOR EXTRACTING PUREE OR JUICE

(76) Inventor: Alessandro Bertocchi, Parma (IT)

( * ) Notice: Subject to any disclaimer, the term of this patent is extended or adjusted under 35 U.S.C. 154(b) by 796 days.

(21) Appl. No.: 13/255,453

(22) PCT Filed: Mar. 9, 2010

(86) PCT No.: PCT/IB2010/000491
§ 371 (c)(1),
(2), (4) Date: Oct. 27, 2011

(87) PCT Pub. No.: WO2010/103376
PCT Pub. Date: Sep. 16, 2010

(65) Prior Publication Data
US 2012/0037013 A1    Feb. 16, 2012

(30) Foreign Application Priority Data
Mar. 9, 2009   (IT) ................ PI2009A0023

(51) Int. Cl.
*A23N 1/00* (2006.01)
*A23N 1/02* (2006.01)
*A22C 17/00* (2006.01)

(52) U.S. Cl.
CPC .............. *A23N 1/02* (2013.01); *A22C 17/0026* (2013.01)

(58) Field of Classification Search
CPC ....... A23N 1/00; A23N 1/02; A22C 17/0026; A23L 2/04; A47J 19/00; B02C 18/062; B01F 7/164
USPC ............ 99/495, 496, 501, 503, 504, 505; 416/242; 366/279, 309, 311–313, 366/330.3, 330.7
See application file for complete search history.

(56) References Cited

U.S. PATENT DOCUMENTS

| | | | | |
|---|---|---|---|---|
| 2,389,862 A * | 11/1945 | McGihon | ........................ | 99/512 |
| 2,803,634 A * | 8/1957 | Chayen | .......................... | 554/23 |
| 2,864,419 A | 12/1958 | Woock | | |
| 4,643,085 A * | 2/1987 | Bertocchi | ....................... | 99/510 |
| 4,852,814 A | 8/1989 | Amiot et al. | | |
| 5,178,335 A * | 1/1993 | Mertens | .......................... | 241/73 |
| 5,239,847 A * | 8/1993 | Lee | ................. | 68/134 |
| 2003/0188640 A1 | 10/2003 | Bertocchi | | |

FOREIGN PATENT DOCUMENTS

| | | | |
|---|---|---|---|
| CH | 359346 | | 12/1961 |
| CH | 359346 A | * | 12/1961 |
| DE | 1206754 B | * | 12/1965 |
| DE | 1292533 B | * | 4/1969 |
| EP | 1870162 A2 | * | 12/2007 |
| FR | 320185 A | * | 12/1902 |
| FR | 322386 A | * | 2/1903 |
| WO | 2004091323 | | 10/2004 |

* cited by examiner

*Primary Examiner* — Dana Ross
*Assistant Examiner* — John J Norton
(74) *Attorney, Agent, or Firm* — Ladas & Parry LLP (57) ABSTRACT

Machine (1) for extracting puree, or fruit juice starting from vegetable or animal food, such as a rough extractor or a fine extractor. The machine (1) comprises essentially a cylindrical body (2) having an inlet (3) for the product to treat, an outlet (4) for a part of the product that can be used and an outlet (5) for another part of product to dispose of. The rotor (6) is wheeled to a motor (80) by a shaft (15). The product that is put in the cylindrical body (2) of the machine (1) is pushed by centrifugal force by a plurality of blades (20) of the rotor (6) to pass through a sieve (7) having holes (8) and a cylindrical or conical shape. The blades (20) of the rotor (6) comprise, in particular a first portion (21) having a first concavity and a second portion (22) having a second concavity opposite to the first.

8 Claims, 7 Drawing Sheets

MACHINE HAVING AN IMPROVED BLADE STRUCTURE, FOR EXTRACTING PUREE OR JUICE

This application is a 371 of PCT/IB2010/000491, filed on Mar. 9, 2010, which is incorporated herein by reference.

FIELD OF THE INVENTION

The present invention relates to a machine for the food industry, and, in particular, it relates to a machine for extracting puree or juice from vegetable or animal food.

The invention relates, furthermore, to a rotor structure for a machine for extracting juice and puree from vegetable or animal food.

DESCRIPTION OF THE PRIOR ART

As well known, the industrial extraction of juice and puree mainly from plant products, such as fruit and vegetables, but also from animal products, such as meat and fish, is effected by means of rotating machines, such as rough extraction machines and finishing extraction machines.

The rotating machines of the prior art comprise, in particular, a driven impeller, or rotor, which is caused to rotate quickly about a rotation axis by a motor. More precisely, the rotor is peripherally equipped with a plurality of blades and is mounted within a perforated wall, or sieve, having cylindrical or conical shape.

During its rotation about its rotation axis, the rotor brings a centrifugal force to the treated product that causes it to pass selectively through the sieve.

This way, the treated product is filtered through the holes of the sieve and the useful part, i.e. the main product containing the pulp and the puree, is conveyed and withdrawn through a first outlet for being then subject to further treatments, whereas a part to dispose of, which in case of fruit contains mainly the skin and the seeds, is carried axially opposite to the inlet and is automatically conveyed towards a discharge exit.

Normally, the extraction machine efficiency is the ratio between the useful amount extracted by the machine and the input amount. Under same other conditions the extraction efficiency increases normally with increasing the angular speed, since the higher is the angular speed, the higher is the contribution of the centrifugal force to bringing the puree through the holes of the sieve and then the higher is the efficiency of the process.

Another parameter that affects the efficiency of the extraction process is the shape of the rotor and, in particular, of its blades of which it has. According to the shape of the rotor, and, in particular, of the shape of the blades, in fact, a action more or less energetic is applied on the treated product.

For example, rotors exist having curved blades that are at an angle towards the rotary speed, as described in IT 1199392, as well as rotors with plane blades and rotors with blades at an angle in a direction opposite to the rotary speed of the rotor.

According to the type of rotor a product is obtained having a different content of parts rich of fibres, i.e. skins, peduncles, seeds, etc. The more the product is rich of these parts, the more the efficiency of the process is high, since increases the fraction of the input product that is turned into a useful product.

In particular, rotors exist that are designed in order to act with a "soft" action on the product to treat, by preferring a lower amount of inclusions of particles of fibrous parts in the puree and a lower efficiency, and rotors exist that are designed, instead, to generate an energetic extraction and then to achieve a high efficiency including in the product also a certain amount of more fibrous parts such as skins, seeds, peduncles etc.

Sometimes the final customer of the machine has the need of including in the final puree all, or a large amount, of the more fibrous part of the input product.

In this case a rotor is used that can apply a strong action on the treated product but absorbing relatively high energy, since during the extraction step part of the energy used is consumed for chopping the product and bringing through the sieve the fibrous part, which is often very hard and dry, and which causes a strong friction on the sieve. Therefore, notwithstanding a high efficiency of the process there is a high energy consumption.

In CH359346 a device is described for cutting, mixing and homogenizing products of various type. The device comprises a rotor that has a plurality of blades radial and that is surrounded by a tubular body having holes of a certain diameter. Furthermore, a central suction chamber is provided that brings by suction the material to treat from a container axially into the rotor. The blades can have curved shape with concavity oriented opposite to the speed of the rotor and an end portion that is bent concordant to the speed of the rotor. More precisely, the curved shape of the blades increases the energy that is transmitted to the product, which is then accumulated quickly at the surface of the tubular body. The bent portion has, instead, the function of scraping from the surface of the tubular body the fraction of product that cannot cross the holes. The device is not adapted to separate with high efficiency peelings and seeds of fruit and vegetables from juice puree, since high amount of product would accumulate at the surface of the tubular body and then a high risk of jamming the holes by the peelings and the seeds would occur.

In EP0299236 an apparatus is described for chopping and filtering food products such as fruit and vegetables to obtain a puree. The apparatus comprises a rotor having blades and mounted in a sieve. The blades of the rotor have a first rectilinear portion, that is nearer to the root of the blade, and a second portion, more distant from the root of the blade, which is also rectilinear and at an angle in the direction which is opposite to the speed of the rotor in order to form a determined angle with respect to the radial direction.

SUMMARY OF THE INVENTION

It is therefore a feature of the invention to provide a machine for extracting puree, or juice, which allows obtaining a high efficiency of the extraction process.

It is another feature of the invention to provide such a machine for extracting puree that allows obtaining at the same time a high production efficiency and a limited energy consumption.

It is a particular feature of the invention to provide a rotor structure for a machine for extracting puree or fruit juice from products of vegetable or animal origin, which allows obtaining a product with high content of fibres.

These and other features are accomplished with one exemplary machine for extracting puree, or juice, from a product of vegetable or animal origin, comprising:

an inlet for the product from which extracting the puree, or the juice;

a sieve having a plurality of holes that is arranged downstream of said inlet and into which said product can be conveyed;

a rotor mounted within said sieve and that is adapted to rotate in the sieve at a determined rotation speed, said rotor having a plurality of blades which can provide a centrifugal force to the product conveyed from said inlet in order to separate said product coming from said inlet into a main product comprising said puree, or juice, which crosses said sieve and is discharged through a first outlet and into a waste product that, instead, cannot cross said sieve and is discharged through a second outlet;

a motor means operatively connected to said rotor, said motor means adapted to bring said rotor to a determined rotation speed;

whose main feature is that at least one blade of the plurality of blades comprises at least one first portion, nearer to the root of said blade, with a first concavity oriented concordant to the rotor speed that is transmitted by said motor means, and at least one second portion, more distant from the root of the blade, with a second concavity oriented opposite to the rotor speed that is transmitted by said motor means.

This particular shape of the blades of the rotor makes highly effective the extraction process of the puree, or the juice, from the products of vegetable or animal origin. More in detail, the first portion of the blade, i.e. a portion nearer to the root of the blade and more distant from the sieve, even if bringing in quick rotation the product, contributes to convey gradually the treated product towards the second portion of the blade, which then pushes the product against the sieve. This way, the product is pushed towards the sieve with a lower rotational energy, avoiding that the product accumulates against the sieve. The second portion of the blade, i.e. a portion that is more distant from the root of the blade and nearer to the sieve, receives gradually the product from the first portion and acts, instead, energetically on the product, squeezing it against the sieve and contributing to chop it by friction against the holes, "grating it" against its surface. This way, a larger amount of fibrous part is turned into puree, or juice. The combined action of these two effects and their contribution provides a rotor that, with limited energy consumption owing to the gradual conveyance of the product towards the second portion of the blade, acts strongly on the product assisting the inclusion of the parts that are richer of fibres, thus increasing the efficiency of the extraction step. This way, peelings, seeds and peduncles of the product remain within the sieve, without wasting the residual part of the pulp that is stuck to them, which is all turned into puree.

For example, this is desirable for increasing the extraction efficiency, avoiding to send in the waste the "good" residual part of the pulp that would be a well acceptable component of the puree, as it can occur for tomato sauce, or for certain types of fruit.

A very thick puree, thus obtained, can be then diluted with juice or with water for reaching the consistency that is desirable for commercialization.

In particular, a program means is provided that is adapted to operate said motor means for rotating said rotor at a first rotary speed, for example in a clockwise direction, or at a second rotary speed opposite to the first rotary speed, for example in a counterclockwise direction.

In particular, at least one among the first and the second portion of said, or each, blade of said plurality has a shaped profile selected from the group comprised of:
  a continuous curved profile;
  a profile comprising a plurality of rectilinear segments, or curved segments, that are at an angle from each other.

In particular, the profile comprising a plurality of rectilinear segments is substantially V-shaped.

In particular, each curvilinear segment, of the profile comprising a plurality of curvilinear segments, is substantially U-shaped.

Preferably, at least one among the first and the second portion of said, or each, blade of the above described plurality of blades has a curved profile.

In particular, the curved profile can be selected from the group comprised of:
  a circular arch;
  an elliptical arch;
  curved line portions at an angle from each other.

Advantageously, both the first portion of the blade and the second portion of the blade have a curved profile.

In particular, the curved profile of the first portion of the blade and the curved profile of the second portion of the blade may have the same radius of curvature.

Alternatively, the radius of curvature of the first and of the second portion of said, or each, blade can be different and, in particular, have a determined ratio.

The first portion of said, or each, blade can extend for a length set between 30 and 98%, preferably between 50 and 90%, of the overall length of the blade with the second portion which extends along the remaining part. In particular, the second portion of said, or each, blade, is oriented along a direction substantially radial to the rotor.

Alternatively, the second portion of said, or each, blade, is oriented along a direction at an angle β with respect to the radial direction of the rotor. For example, the angle β can be set between 0° and 90°, Advantageously between 10° and 80°, preferably between 20° and 70°.

According to the invention, furthermore, the rotor of the machine for extracting puree, or juice, from animal or vegetable products, can comprise a combination of configurations.

For example, the rotor can comprise:
  a first part where the blades have a first portion, i.e. a portion nearer to the root, with concavity oriented concordant to the rotor speed that is transmitted by said motor means, and a second portion, i.e. a portion nearer to the sieve, having concavity oriented opposite to the speed of the rotor;
  a second part where the blades have a first portion, i.e. a portion nearer to the root, with concavity oriented opposite to the rotary speed of the rotor and a second portion, i.e. a portion nearer to the sieve, having concavity oriented concordant to the rotor speed that is transmitted by said motor means.

This particular configuration of the rotor can be used for reducing the extraction energy of the machine in order to limit the amount of more fibrous parts of product, such as the seeds, which passes into the puree path. For example, in certain types of vegetables with seeds, their squeezing for all the length of the rotor would cause a worsening of the taste of the puree. With this configuration of the rotor, instead, the most consistent fraction of the fibrous part does not pass and is discharged with the waste. In fact, the second part of the rotor forces energetically the product against the sieve with the innermost portion of the blade, but it allows the end portion of the blade to raise from the sieve small parts that have not passed, acting, then, as scraper in a soft way between blade and sieve when these parts (such as the seeds) do contact the rotor.

In an exemplary embodiment of the invention, the rotor comprises:
  a first part equipped with a first plurality of blades having a first concavity oriented concordant to the rotor speed;
  a second part equipped with a second plurality of blades having a second concavity with respect to said radial direction oriented opposite to the rotor speed.

According to another aspect of the invention, a rotor for a machine for extracting puree, or fruit juice, from a product of vegetable or animal origin, comprises:

a plurality of blades which can provide a centrifugal force to the product of vegetable or animal origin,
wherein:
at least one blade of the plurality of blades comprises a first portion, nearer to the root of the blade, with a first concavity oriented concordant to the rotor speed that is transmitted by said motor means, and at least one second portion, more distant from the root of the blade, with a second concavity oriented opposite to the rotor speed that is transmitted by said motor means.

According to a further aspect of the invention, a blade for a rotor of a machine for extracting puree, or fruit juice, from a product of vegetable or animal origin, comprises at least one first portion, nearer to the root of the blade, with a first concavity oriented concordant to the rotor speed that is transmitted by said motor means, and at least one second portion, more distant from the root of the blade, with a second concavity oriented opposite to the rotor speed that is transmitted by said motor means.

According to still another aspect of the invention, a machine for extracting puree, or fruit juice, from a product of vegetable or animal origin, has a rotor with a plurality of blades, wherein at least one of said blades comprises a first portion, nearer to the root of the blade, with a first concavity oriented concordant to the rotor speed that is transmitted by said motor means, and at least one second portion, more distant from the root of the blade, with a second concavity oriented opposite to the rotor speed that is transmitted by said motor means.

BRIEF DESCRIPTION OF THE DRAWINGS

The invention will be now shown with the following description of an exemplary embodiment thereof, exemplifying but not limitative, with reference to the attached drawings in which.

DESCRIPTION OF EXEMPLARY EMBODIMENTS

Figure 1:
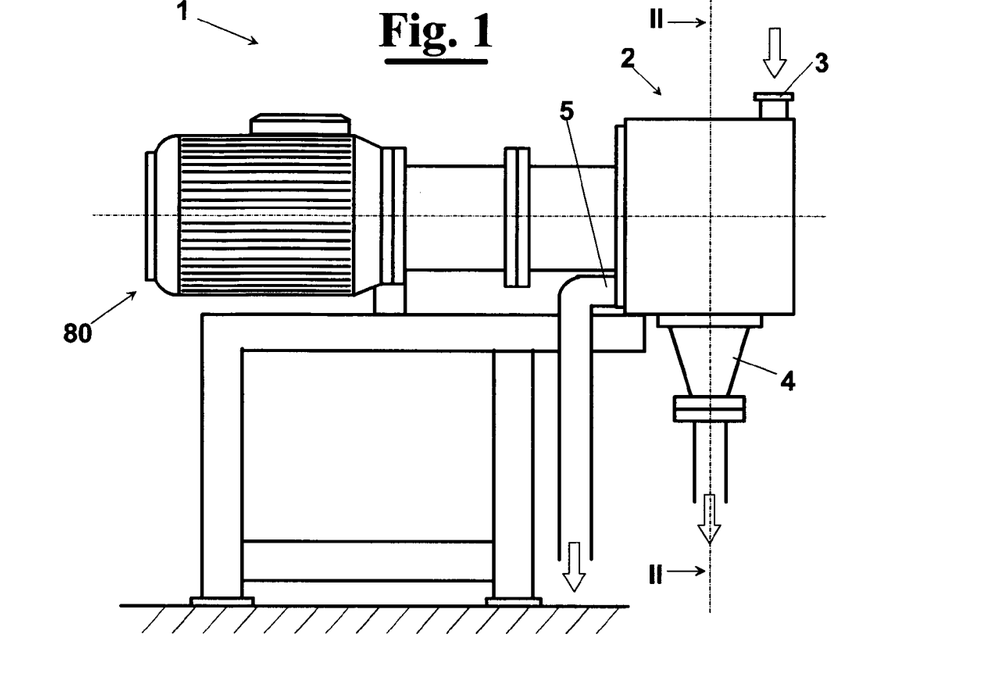
FIG. 1 diagrammatically shows an elevational side view of a extraction machine of juice, or puree from animal or vegetable products on which a rotor structure can be installed, according to the invention.
Figure 2:
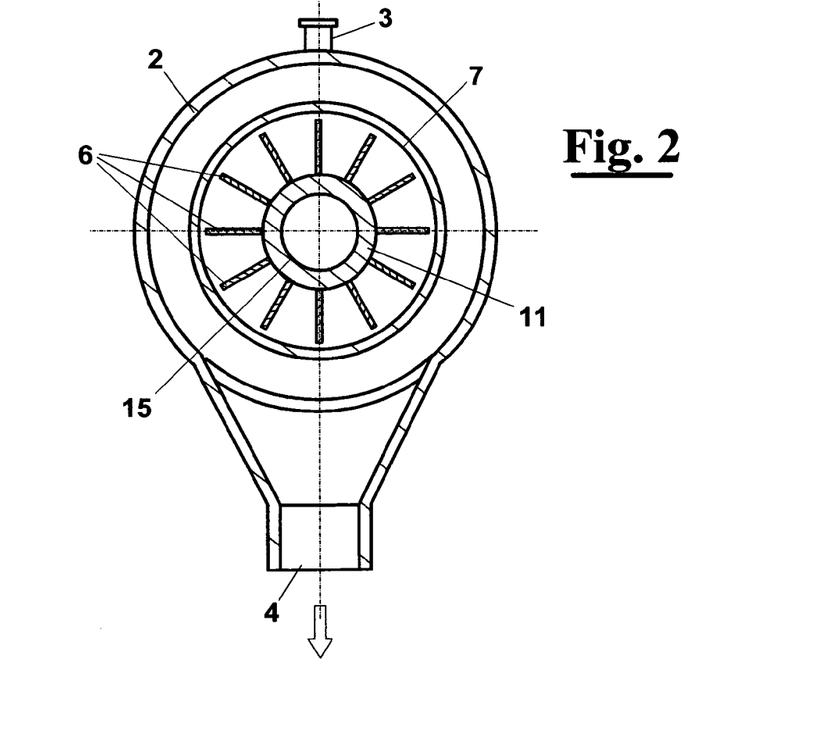
FIG. 2 shows the extraction machine of juice, or puree, from animal or vegetable products, in a cross sectional view according to arrows II-II.

In FIG. 1 for example a possible machine 1 is shown that is used in plants for making puree, or fruit juice, starting from vegetable or animal food, such as an extractor, or a fine extractor, according to the invention. It comprises essentially a cylindrical body 2 having an inlet 3 for the product to treat, an outlet 4 for a part of the product that can be used, and a outlet 5 for a part of the product to dispose of.

Figure 3:
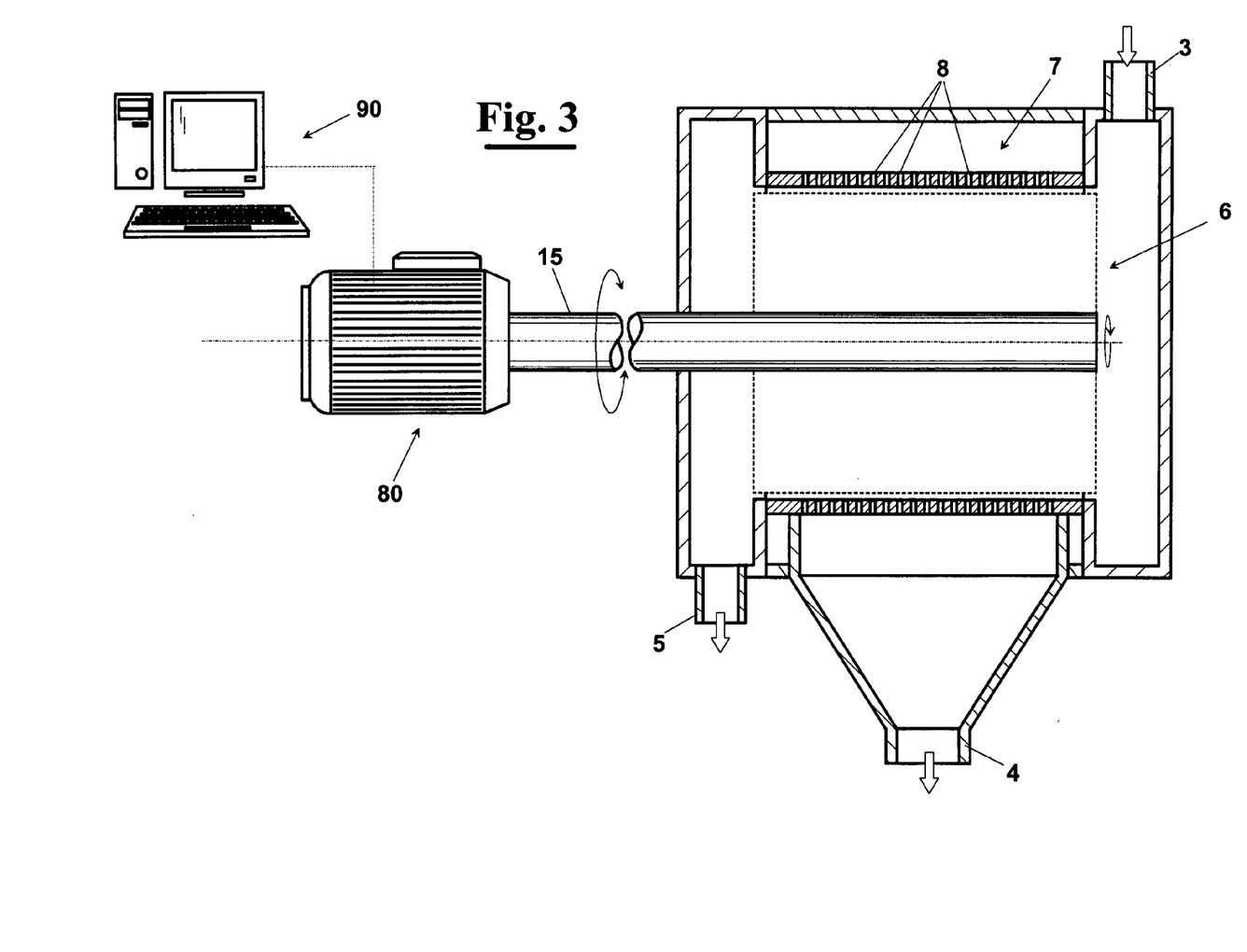
FIG. 3 shows the machine of FIG. 1 in a partial cross sectional view along a longitudinal plane.

Machine 1 has a rotor 6, whose encumbrance is diagrammatically shown with a dashed line in FIG. 3, and which is connected to a motor 80 by a shaft 15. The product that is put into cylindrical body 2 of machine 1 is then pushed by centrifugal force by a plurality of blades 20 of rotor 6, which cause it to pass through a sieve 7 having cylindrical or conical shape and having holes 8 of measured dimension According to the invention and as shown in FIG. 4A, blades 20 of rotor 6 comprise a first portion 21, i.e. a portion nearer to the root of blade 20, with concavity oriented concordant to the rotor speed that is transmitted by said motor means 6, and a second portion 22, i.e. a portion that is more distant from the root of blade 20, with an opposite concavity.

Figures 4A, 4B:
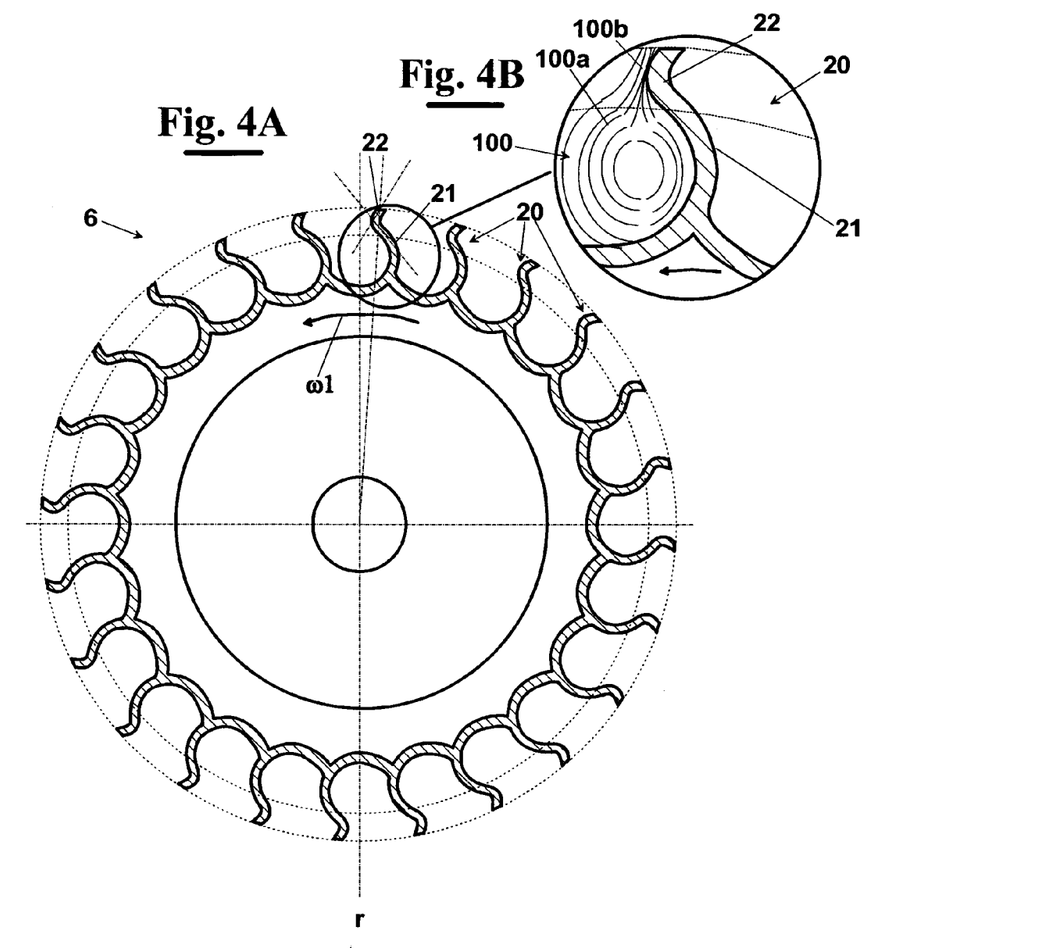
FIG. 4A shows a cross sectional view of a first exemplary embodiment of a rotor used in the machine of FIG. 1.
FIGS. 4B and 5 show in detail a blade of the rotor of FIG. 4A for depicting some structural and functional features.
Figure 5:
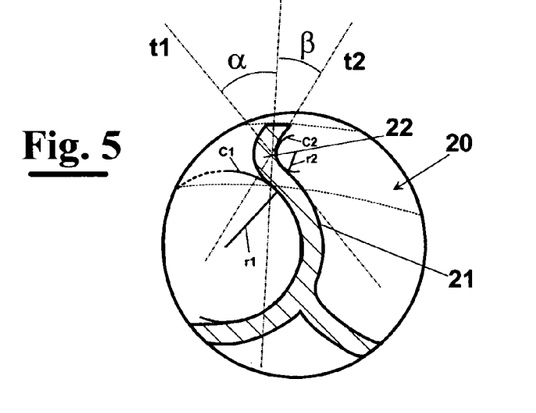

In the case shown in FIGS. 4A, 4B and 5, portions 21 and 22 of blade 20 have curved profile. In particular, for each of it a inflexion point is detectable, or angle point, at which a line, tangential to t1, or t2, forms a determined angle with the radial direction r. More precisely, portion 21 is oriented concordant to the rotor speed that is transmitted by said motor means 6 and is at an angle α with respect to the radial direction r, whereas the end portion of second portion 22 is oriented opposite to the rotor speed that is transmitted by said motor means 6, and in its external part is at an angle β with respect to the radial direction r.

This particular shape of the blades of the rotor makes highly effective the extraction process of the puree, or the juice, from the products of vegetable or animal origin treated. More in detail, as diagrammatically shown in FIG. 4B, portion 21 of blade 20 even if bringing in quick rotation the product, with its spoon-like shape, in part holds the product thus obtaining a gradual pass of the treated product 100 towards second portion 22 of blade 20, which then energetically the product against sieve 7. Actually the fraction 100a of treated product held by portion 21 of blade 20 is much higher than the fraction 100b treated by portion 22. This way, the product is pushed towards sieve 7 with a lower rotational energy, avoiding the accumulation of product against sieve 7. Such accumulation, which occur with the rotors of the prior art, would have as effect a higher energy consumption and risk of jamming at second portion 22.

Portion 22 of blade 20 can, then, act energetically on the fraction of product 100b, that is less than fraction 100a, squeezing it on sieve 7 and contributing to mash it by friction against holes 8, "grating it" against its surface. This way, is causes a larger amount of fibrous part to be turned into puree, or juice. The combined action of these two effects and their contribution is due to a rotor 6 that, with limited energy consumption, acts strongly on the product assisting the inclusion of the parts that are richer of fibres and increasing the efficiency of the extraction process.

A parameter that can be varied for changing the features of the product and the efficiency of the extraction machine is the ratio between the respective lengths of portions 21 and 22 of the blade. For example, portion 21 of blade 20 can be between 50 to 90% of the overall length of the blade, preferably between 70 to 80%. Portion 22 extends, instead, for the remaining part.

Another parameter that can be varied to obtain a product with particular nutritional and organoleptic features, but especially with physical characteristics of higher density, is the radius of curvature r1 and r2 of each curved portion 21, or 22, of blades 20. In particular, by changing the ratio between the radius of curvature r1 and r2 of curved portions 21 and 22 it is possible to obtain determined products.

Figure 9:
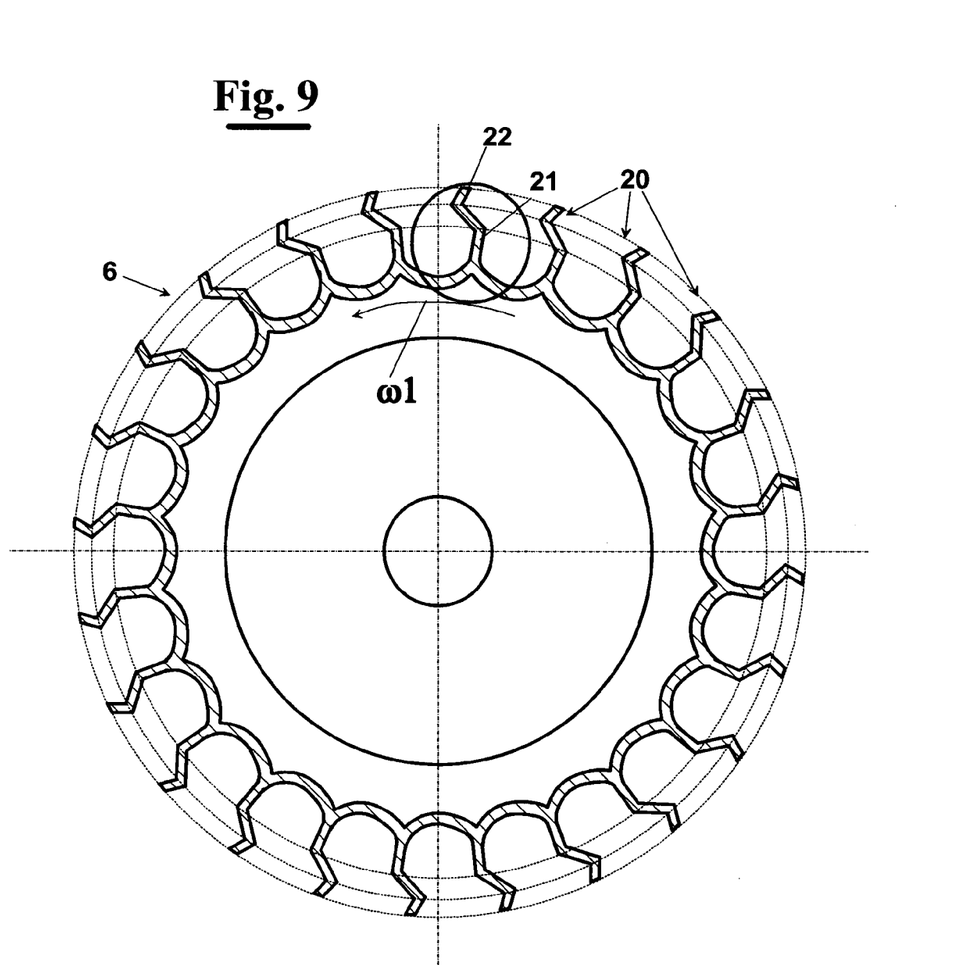
FIG. 9 shows a cross sectional view of a further exemplary embodiment of the rotor of FIG. 1.
Figure 10:
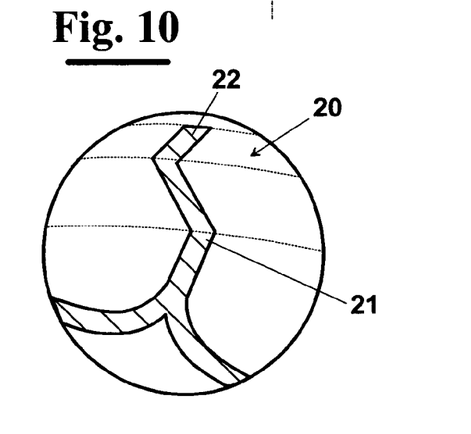
FIG. 10 shows in detail a blade of the rotor of FIG. 9.

In the exemplary embodiment shown in FIGS. 9 and 10, both portions 21 and 22 of rotor 6 have a profile comprising rectilinear segments. More precisely, both portion 21 and portion 22 have substantially a "V" shape with inclination and length that are selected responsive to the type of desired product.

Figures 11, 12, 13:
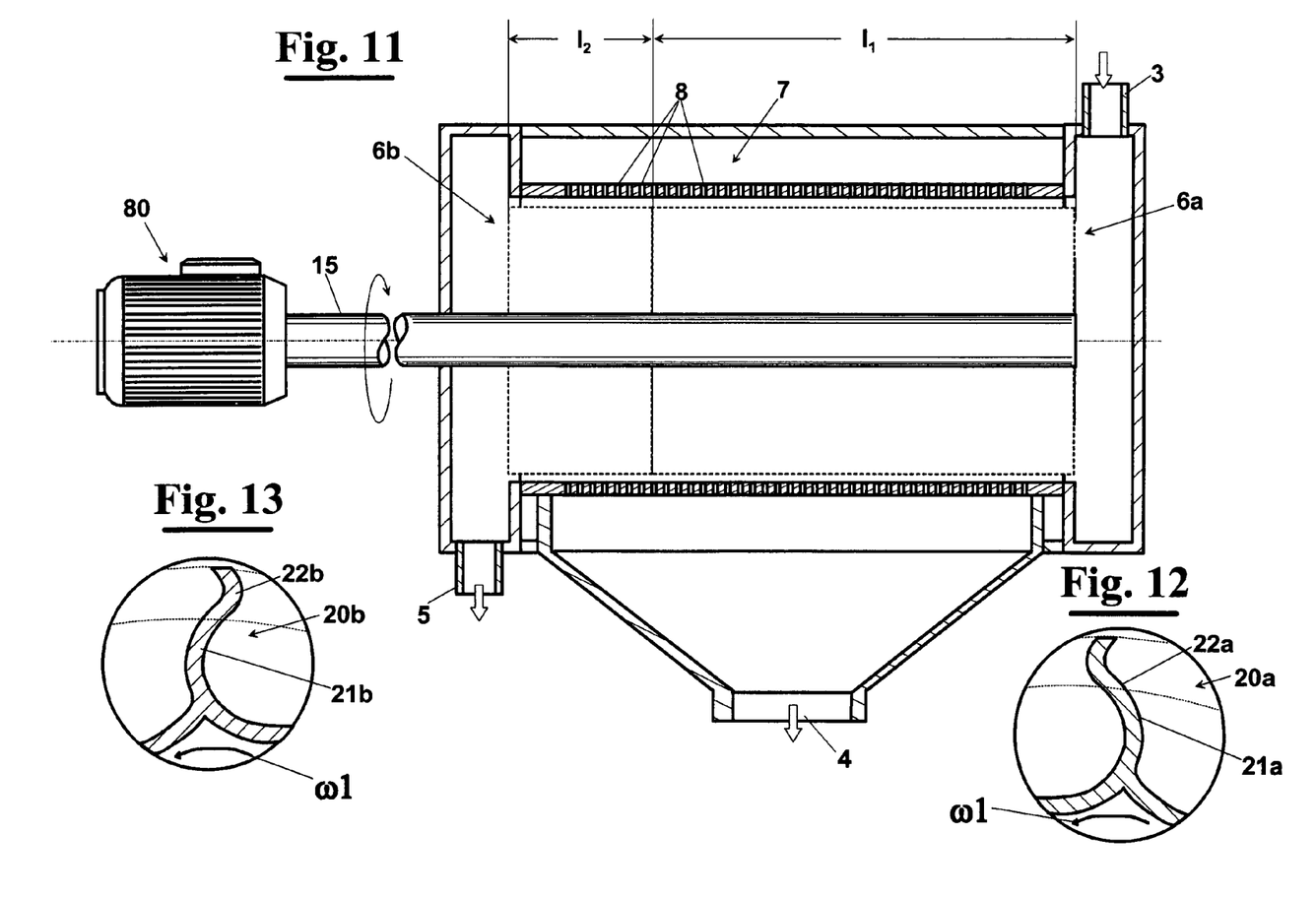
FIG. 11 shows a longitudinal sectional view of an exemplary embodiment of the extraction machine of juice, or puree, from animal or vegetable products of FIG. 2.
FIG. 12 shows in detail a cross sectional view of a blade of the first part of the rotor of the extraction machine of FIG. 11.
FIG. 13 shows in detail a cross sectional view of a blade of the second part of the rotor of the extraction machine of FIG. 11.

In FIG. 11 a longitudinal sectional view is shown of an exemplary embodiment of rotor 6. In this case, rotor 6 comprises a first and a second part 6a and 6b, of which in FIG. 11 the respective size as dashed line rectangles are diagrammatically shown. In particular, first part 6a, which extends for a portion of length 11, comprises a plurality of blades 20a having a first portion 21a, i.e. a portion nearer to the root, with concavity oriented concordant to the rotation speed of shaft 15 of machine 1 and a second portion 22a, i.e. a portion nearer to the sieve, with concavity oriented opposite to the speed of the rotor.

Second part 6b extends for a portion of length 12, for example with length 12 less than length 11, where blades 20b have a first portion 21b, i.e. a portion nearer to the root, with concavity oriented opposite to the rotary speed of shaft 15 of machine 1 and a second portion 22b, i.e. a portion nearer to the sieve, having concavity oriented concordant to the rotor speed that is transmitted by said motor means 6.

Figure 6:
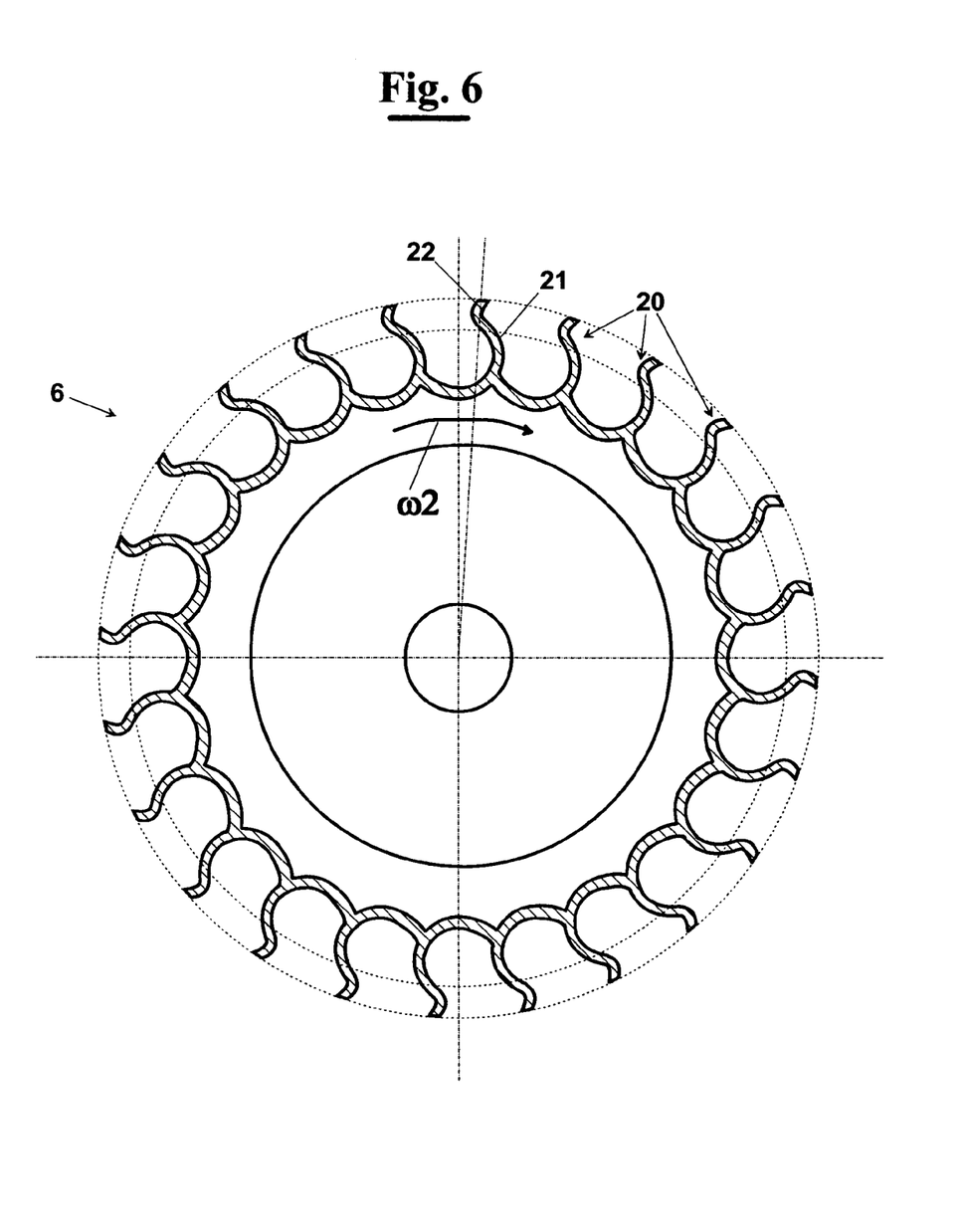
FIG. 6 shows a cross sectional view of the rotor of FIG. 1 that has a rotary speed of the motor opposite to the rotary speed of FIG. 4.

As shown in FIG. 6, portion 21b of blade 20b, i.e. the innermost portion, is at an angle which is opposite to the speed of rotor 6, whereas portion 22b, i.e. the outermost portion of blade 20b, is at an angle concordant to the rotary speed of rotor 6. In this case, second part 6b of rotor 6 produces a stronger action on the treated product with respect to first part 6a, and then more selective. This avoids, therefore, the movement of the seeds still present in the treated product in the puree obtaining a final product of various types with respect to the previous case, i.e. less rich of fibrous part.

This particular configuration of rotor 6 can be obtained for example using a first part 6a and a second part 6b of rotor 6 free of rotating independently from each other. More precisely, first part 6a of rotor 6 rotates in a clockwise direction, with angular speed ω1, whereas second part 6b of rotor 6 rotates in a counterclockwise direction, with angular speed ω2.

Figure 7:
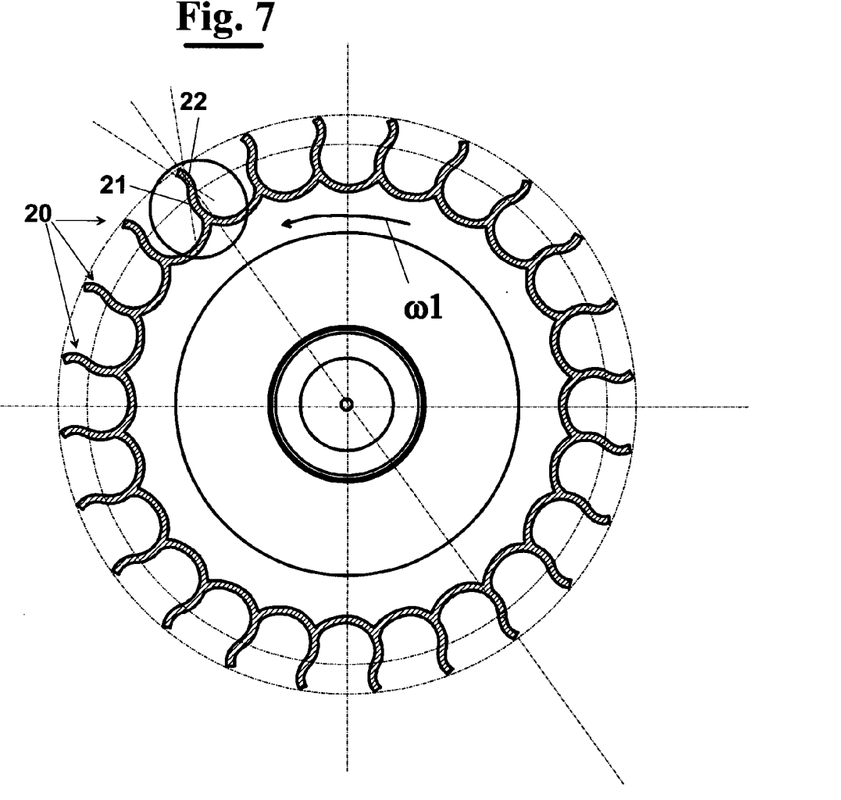
FIG. 7 shows a cross sectional view of an exemplary embodiment of the rotor of FIG. 1.
Figure 8:
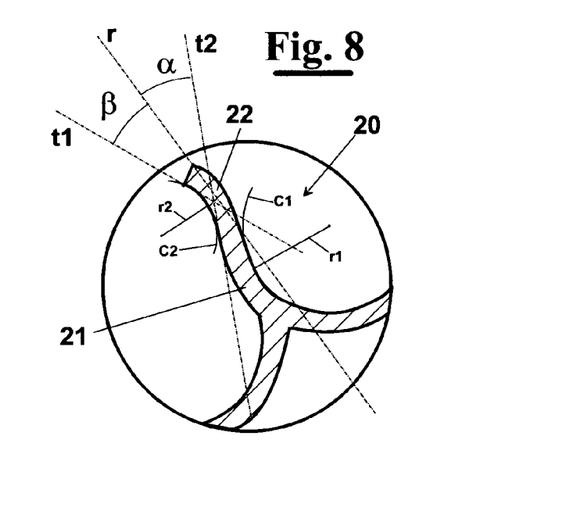
FIG. 8 shows in detail a blade of the rotor of FIG. 7.

A same result can be obtained by causing the first and second part 6a and 6b of rotor 6 to rotate at a same angular speed ω1, but using rotor 6' shown in FIG. 7. In this case, in fact, blades 20 of second part 6b comprise a innermost portion 21' at an angle α in the direction which is opposite to the speed of shaft 15 and an outermost portion 22 that is nearer to sieve 7 oriented concordant to the speed of shaft 15.

In the case of such configuration of rotor 6, first part 6a of rotor 6 produces a stronger action on the product, causing a higher amount of fibrous part to pass through the sieve and obtaining therefore a high efficiency. This is due to a combination of the action of the centrifugal force and of the scraping action of blades 20a. Second part 6b of rotor 6, instead, produces on the residual product a more "soft" extraction, that is more selective for extraction of further juice, or pulp, from the product.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A machine for extracting puree, or juice from a product of vegetable or animal origin, comprising:
   an inlet for the product from which extracting the puree, or the juice;
   a sieve having a plurality of holes that is arranged downstream of said inlet and into which said product can be conveyed;
   a rotor mounted within said sieve and that is adapted to rotate in said sieve at a determined direction of rotation, said rotor having a plurality of blades which can provide a centrifugal force to the product conveyed from said inlet in order to separate said product coming from said inlet into a main product, comprising said puree, or juice, which crosses said sieve and is discharged through a first outlet, and into a waste product that, instead, cannot cross said sieve and is discharged through a second outlet;
   a motor operatively connected to said rotor, said motor means adapted to bring said rotor to a determined direction of rotation;
   wherein at least one blade of the plurality of blades comprises at least one first portion, nearer to the root of said blade, with a first concavity oriented concordant to the rotor direction of rotation that is transmitted by said motor means, and at least one second portion, more distant from the root of the blade, with a second concavity oriented opposite to the rotor direction of rotation that is transmitted by said motor; and
   wherein at least one among said first and said second portion of said, or each, blade of said plurality of blades has a shaped profile selected from the group consisting of:
   a continuous curved profile; and
   a profile comprising a plurality of rectilinear segments, or curved segments, that are at an angle from each other.

2. A machine according to claim 1, wherein said profile comprising a plurality of rectilinear segments is substantially V-shaped.

3. A machine according to claim 1, wherein each curvilinear segment of said profile comprising a plurality of curvilinear segments is substantially U-shaped.

4. A machine according to claim 1, wherein said first and said second portion of said blades have a curved profile with radii of curvature selected from the group consisting of:
   a substantially alike radius of curvature; and
   a radius of curvature having a determined ratio.

5. A machine according to claim 1, wherein both said first portion of said blade and said second portion of said blade have both a curved profile.

6. A machine according to claim 1, wherein said first portion of said, or each, blade extends for a length set between 30 and 98% of the overall length of said blade, preferably between 50 and 90%, said second portion occupying the remaining part.

7. A machine according to claim 1, wherein at least one among said first and said second portion of said, or each, blade of said plurality of blades has a curved profile selected from the group consisting of:
- a circular arch;
- an elliptical arch; and
- curved portions at an angle from each other.

8. A machine according to claim 1, wherein, furthermore, a program means is provided to operate said motor so that said rotor moves at a clockwise direction of rotation, or at a counterclockwise direction of rotation.

* * * * *